3,236,814
PREPARATION OF SPINNABLE POLYESTERS
USING TIN CATALYST
Gabor Halmi and Ram Advani, Frankfurt am Main, Germany, assignors to Firma Hans J. Zimmer Verfahrenstechnik, Frankfurt am Main, Germany, a corporation
No Drawing. Filed Aug. 23, 1962, Ser. No. 218,856
Claims priority, application Germany, Aug. 31, 1961,
Z 8,943
7 Claims. (Cl. 260—75)

This invention relates to a process for the production of spinnable polyesters.

It is known to produce spinnable polyesters by polycondensation of dicarboxylic acids with glycols. The starting materials for the commercial production of polyester fibers are primarily aromatic dicarboxylic acids such as terephthalic acid and lower aliphatic glycols such as ethylene glycol or propylene glycol. Polyethylene glycol terephthalate is usually produced by first subjecting the dimethyl ester of terephthalic acid (dimethyl terephthalate) to transesterification with ethylene glycol to form diethylene glycol terephthalate and, in a subsequent operation, subjecting the diethylene glycol terephthalate to polycondensation to form spinnable polyethylene glycol terephthalate. Both the transesterification and polycondensation are conventionally effected at elevated temperatures in the presence of catalysts. Various metal salts among which are tin salts have been suggested as catalysts. However, the known tin derivatives used as catalysts suffer from the disadvantage that they are capable of catalyzing the polycondensation to form light spinnable polyesters only in the complete absence of water and acids. It is very difficult in practice to exclude completely the presence of small amounts of moisture introduced with one of the starting components or of traces of free acids originating from the dicarboxylic acid in producing polyesters.

Accordingly, it is an object of this invention to provide catalysts for the production of spinnable polyesters and particularly of polyethylene glycol terephthalate, which catalysts fully retain their activity even in the presence of small amounts of moisture or traces of free acids and, therefore, may be added already in the transesterification and which, in the polycondensation, give polymers of high mean molecular weight at high reaction rates and comparatively low temperatures.

These requirements are fully met by organic mercapto-tin compounds of the general formula

wherein $R_1$ is a mercaptan group, $R_2$ is likewise a mercaptan group or an alcohol group or a carboxylic acid group and $R_3$ and $R_4$ are an alkyl, aryl, alkaryl or aralkyl or cycloalkyl radical.

Examples of organic mercapto-tin compounds which are suitable for use in the production of spinnable polyesters in accordance with the invention include dodecylmercapto-dibutyl tin stearate, dodecylmercapto-dibutyl tin-ethyl ester maleate, hexylmercapto-methyl-tin crotonate, hexylmercapto-methylhexyl-tin crotonate and butylmercapto-dibutyl-tin methyl ester maleate. These mercapto tin compounds are added in amounts of from 0.005 to 0.5% and preferably of 0.01 to 0.09%, based on dimethyl terephthalate, already in the transesterification of dimethyl terephthalate with ethylene glycol.

With the amounts of catalyst mentioned above, the present process permits the transesterification and polycondensation to be carried out at low temperatures of from about 190 to 250° C. within short reaction periods. When adding the preferred amounts, the transesterification period is about 2 hours and, after a polycondensation period of further two hours, a polymer having an intrinsic viscosity of 0.9 or more (measured in a 0.5% phenol-tetrachloroethane solution at 20° C.) is obtained. Polymers having substantially lower mean molecular weights are obtained with known tin catalysts under comparable conditions.

The thermal stability and insensitivity to UV radiation of the polyesters prepared with the addition of the mercapto tin compounds have been found to be particularly advantageous. The polymers are bright and colorless and do not tend to discoloration in further processing, e.g., when being spun, or in use.

Example 1

1 mole of dimethyl terephthalate was transesterified with 2.2 moles of ethylene glycol in the presence of 0.1% by weight of dodecyl-mercapto-dibutyl tin laurate at a temperature of 180° to 190° C. and the excess glycol was removed. Following this, the temperature was gradually increased to 200° C. and the pressure reduced to 5 mm. Hg. After a polycondensation period of 2 hours, a clear, almost colorless polyester was obtained which could be spun satisfactorily under conventional conditions.

Example 2

1 mole of dimethyl terephthalate was transesterified with 2.2 moles of ethylene glycol in the presence of 0.12% by weight of hexylmercapto-methylhexyl tin crotonate at a temperature of 180 to 190° C. and the excess glycol was removed. Then the temperature was gradually increased to 200° C. and the pressure reduced to 5 mm. Hg. A clear, almost colorless polyester which could be spun satisfactorily under conventional conditions was obtained after a polycondensation period of 2 hours.

Example 3

1 mole of dimethyl terephthalate was transesterified with 2.2 moles of ethylene glycol in the presence of 0.11% by weight of butylmercapto-dibutyl tin methyl ester maleate at a temperature of 180 to 190° C. and the excess glycol was removed. Then the temperature was gradually increased to 200° C. and the pressure reduced to 5 mm. Hg. A clear, almost colorless polyester which could be spun satisfactorily under conventional conditions was obtained after a polycondensation period of 2 hours.

What is claimed is:
1. An improved process for producing polyesters by transesterification of dimethyl terephthalate with ethylene glycol to form the ethylene glycol diester of terephthalic acid followed by polycondensation of said ethylene glycol diester of terephthalic acid, which comprises reacting said dimethyl terephthalate with ethylene glycol in the presence of a catalytic amount of a tin compound of the formula

wherein $R_1$ is a mercapto group, $R_2$ is a member selected from the group consisting of lauroyl-oxy, crotonyoyl-oxy, stearoyl-oxy, maleoyl-oxy, and mono-lower-alkyl esters of maleoyl-oxy radicals, and $R_3$ and $R_4$ are each alkyl.

2. Process according to claim 1, wherein said tin compound is employed in an amount of 0.005 to 0.5% referred to the dimethyl terephthalate present.

3. An improved process for producing polyesters by transesterification of dimethyl-terephthalate with ethylene glycol to form the ethylene glycol di-ester of terephthalic acid followed by polycondensation of said ethylene glycol di-ester of terephthalic acid, which comprises reacting said dimethyl-terephthalate with ethylene glycol in the presence of a catalytic amount of dodecyl-mercapto-dibutyl-tin-laurate.

4. An improved process for producing polyesters by transesterification of dimethyl-terephthalate with ethylene glycol to form the ethylene glycol di-ester of terephthalic acid followed by polycondensation of said ethylene glycol di-ester of terephthalic acid, which comprises reacting said dimethyl-terephthalate with ethylene glycol in the presence of a catalytic amount of hexylmercapto-methylhexyl-tin-crotonate.

5. An improved process for producing polyesters by transesterification of dimethyl-terephthalate with ethylene glycol to form the ethylene glycol di-ester of terephthalic acid followed by polycondensation of said ethylene glycol di-ester of terephthalic acid, which comprises reacting said dimethyl-terephthalate with ethylene glycol in the presence of a catalytic amount of butyl-mercapto-dibutyl-tin-methyl-ester-maleate.

6. An improved process for producing polyesters by transesterification of dimethyl-terephthalate with ethylene glycol to form the ethylene glycol di-ester of terephthalic acid followed by polycondensation of said ethylene glycol di-ester of terephthalic acid, which comprises reacting said dimethyl-terephthalate with ethylene glycol in the presence of a catalytic amount of dodecyl-mercapto-dibutyl-tin-ethyl-ester-maleate.

7. An improved process for producing polyesters by transesterification of dimethyl-terephthalate with ethylene glycol to form the ethylene glycol di-ester of terephthalic acid followed by polycondensation of said ethylene glycol di-ester of terephthalic acid, which comprises reacting said dimethyl-terephthalate with ethylene glycol in the presence of a catalytic amount of hexyl-mercapto-methyl-tin-crotonate.

References Cited by the Examiner

UNITED STATES PATENTS

| | | | |
|---|---|---|---|
| 2,465,319 | 3/1949 | Whinfield et al. | 260—75 |
| 2,956,985 | 10/1960 | Scruggs et al. | 260—75 |

FOREIGN PATENTS 577,788   6/1959   Canada.

WILLIAM H. SHORT, *Primary Examiner.*

LOUISE P. QUAST, *Examiner.*